US008058354B2

(12) United States Patent
Williams et al.

(10) Patent No.: US 8,058,354 B2
(45) Date of Patent: *Nov. 15, 2011

(54) MODIFIED CARBOXYLATED POLYOLEFINS AND THEIR USE AS ADHESION PROMOTERS

(75) Inventors: Kevin Alan Williams, Kingsport, TN (US); Robert Lee Eagan, Kingsport, TN (US); Lisa Kay Templeton, Kingsport, TN (US); Richard Leon McConnell, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/610,238

(22) Filed: Jun. 30, 2003

(65) Prior Publication Data

US 2004/0072960 A1   Apr. 15, 2004

Related U.S. Application Data

(63) Continuation-in-part of application No. 10/068,630, filed on Feb. 6, 2002, now abandoned, and a continuation-in-part of application No. 10/208,642, filed on Jul. 30, 2002, now abandoned, which is a continuation-in-part of application No. 09/943,561, filed on Aug. 30, 2001, now abandoned.

(60) Provisional application No. 60/267,829, filed on Feb. 9, 2001.

(51) Int. Cl.
*C08F 8/14* (2006.01)
*C08F 8/32* (2006.01)
*C08F 8/46* (2006.01)
*C08C 19/22* (2006.01)
*C08C 19/28* (2006.01)
*C08C 19/36* (2006.01)

(52) U.S. Cl. ............ 525/333.7; 525/384; 525/386; 524/576; 524/570

(58) Field of Classification Search ............... 525/333.7, 525/384, 386; 524/576, 570
See application file for complete search history.

(56) References Cited

U.S. PATENT DOCUMENTS

| 3,579,485 | A |   | 5/1971  | Folzenlogen et al. |
| 3,579,486 | A |   | 5/1971  | McConnell et al. |
| 3,642,722 | A |   | 2/1972  | Knowles et al. |
| 4,033,889 | A |   | 7/1977  | Kiovsky |
| 4,070,421 | A |   | 1/1978  | Etter, Jr. |
| 4,146,590 | A | * | 3/1979  | Yamamoto et al. ............ 525/168 |
| 4,229,754 | A |   | 10/1980 | French |
| 4,286,047 | A |   | 8/1981  | Bennett et al. |
| 4,299,754 | A |   | 11/1981 | Shiomi et al. |
| 4,303,697 | A |   | 12/1981 | Baseden |
| 4,461,809 | A |   | 7/1984  | Shiomi et al. |
| 4,506,056 | A |   | 3/1985  | Gaylord |
| 4,632,962 | A | * | 12/1986 | Gallucci ........................ 525/282 |
| 4,698,395 | A |   | 10/1987 | Inoue et al. |
| 4,727,120 | A |   | 2/1988  | Nogues |
| 4,735,992 | A |   | 4/1988  | Nogues |
| 4,762,890 | A |   | 8/1988  | Strait et al. |
| 4,788,264 | A |   | 11/1988 | Ukita |
| 4,857,600 | A |   | 8/1989  | Gross et al. |
| 4,880,849 | A |   | 11/1989 | Poole et al. |
| 4,927,888 | A |   | 5/1990  | Strait et al. |
| 4,954,573 | A |   | 9/1990  | Fry et al. |
| 4,966,947 | A | * | 10/1990 | Fry et al. ...................... 525/327.6 |
| 4,968,559 | A |   | 11/1990 | Kuroda et al. |
| 4,987,190 | A |   | 1/1991  | Keogh |
| 4,997,882 | A |   | 3/1991  | Martz et al. |
| 4,999,403 | A |   | 3/1991  | Datta et al. |
| 5,001,197 | A |   | 3/1991  | Hendewerk |
| 5,021,510 | A |   | 6/1991  | Vroomans |
| 5,030,681 | A |   | 7/1991  | Asato et al. |
| 5,059,658 | A |   | 10/1991 | Sezume et al. |
| 5,102,956 | A |   | 4/1992  | Holmes-Farley |
| 5,109,097 | A |   | 4/1992  | Klun et al. |
| 5,118,567 | A |   | 6/1992  | Komiyama |
| 5,130,371 | A |   | 7/1992  | Fujita et al. |
| 5,135,984 | A |   | 8/1992  | Kinosada et al. |
| 5,137,975 | A |   | 8/1992  | Kelusky |
| 5,143,976 | A |   | 9/1992  | Ashihara et al. |
| 5,218,029 | A |   | 6/1993  | Brook |

(Continued)

FOREIGN PATENT DOCUMENTS

EP        0 355 895 A2    2/1990

(Continued)

OTHER PUBLICATIONS

Office Action dated Sep. 22, 2004, from the European Patent Office for Application No. 02756848.4.

(Continued)

*Primary Examiner* — Roberto Rabago
(74) *Attorney, Agent, or Firm* — Dennis V. Carmen; Bernard J. Graves, Jr.

(57) ABSTRACT

The present invention provides solvent- and water-based primer compositions that include at least one carboxylated polyolefin that has been modified with one or more polyfunctional alcohols. The carboxylated polyolefins are obtained by the reaction of polyolefins with at least one of unsaturated carboxylic esters, unsaturated carboxylic acids, unsaturated carboxylic anhydrides, acrylic monomers, and mixtures thereof. The carboxylated polyolefins are then further modified by reaction with one or more polyfunctional alcohols. These polyfunctional alcohol-modified polyolefins may also contain pendant carboxyl groups, which have the propensity to form hydrophilic salts with amines or inorganic bases, thereby rendering the polyfunctional alcohol-modified polyolefins water-dispersible. These primer compositions are useful for significantly improving the adhesion of paints, adhesives, and inks to various plastic and metal substrates.

14 Claims, No Drawings

U.S. PATENT DOCUMENTS

| | | | |
|---|---|---|---|
| 5,227,198 A | | 7/1993 | Laura et al. |
| 5,262,075 A | | 11/1993 | Chung et al. |
| 5,286,799 A | | 2/1994 | Harrison et al. |
| 5,290,954 A | | 3/1994 | Roberts et al. |
| 5,300,363 A | | 4/1994 | Laura et al. |
| 5,310,806 A | | 5/1994 | Wild et al. |
| 5,346,963 A | | 9/1994 | Hughes et al. |
| 5,360,862 A | | 11/1994 | Roberts et al. |
| 5,367,022 A | | 11/1994 | Kiang et al. |
| 5,369,170 A | | 11/1994 | Weinkauf |
| 5,373,048 A | * | 12/1994 | Witzeman et al. ............ 524/458 |
| 5,412,029 A | | 5/1995 | Elm et al. |
| 5,420,303 A | | 5/1995 | Roberts et al. |
| 5,424,367 A | | 6/1995 | Auda et al. |
| 5,427,856 A | | 6/1995 | Laura et al. |
| 5,436,079 A | | 7/1995 | Brugel |
| 5,461,113 A | | 10/1995 | Marczinke et al. |
| 5,523,358 A | | 6/1996 | Hirose et al. |
| 5,550,195 A | | 8/1996 | Harris et al. |
| 5,587,418 A | | 12/1996 | Sasaki et al. |
| 5,620,747 A | | 4/1997 | Laura et al. |
| 5,626,915 A | | 5/1997 | Laura et al. |
| 5,629,046 A | | 5/1997 | Laura et al. |
| 5,650,468 A | | 7/1997 | Vandevijver et al. |
| 5,651,927 A | | 7/1997 | Auda et al. |
| 5,663,266 A | | 9/1997 | Taylor et al. |
| 5,693,423 A | | 12/1997 | Laura et al. |
| 5,709,946 A | | 1/1998 | Jackson et al. |
| 5,728,767 A | | 3/1998 | Kanetou et al. |
| 5,728,776 A | | 3/1998 | Takemura et al. |
| 5,756,566 A | | 5/1998 | Laura |
| 5,759,703 A | | 6/1998 | Neymark et al. |
| 5,801,219 A | | 9/1998 | Neymark et al. |
| 5,804,640 A | | 9/1998 | Laura et al. |
| 5,811,489 A | | 9/1998 | Shirai et al. |
| 5,821,301 A | | 10/1998 | Tsuneka et al. |
| 5,863,646 A | | 1/1999 | Verardi et al. |
| 5,880,190 A | | 3/1999 | Laura |
| 5,910,530 A | | 6/1999 | Wang et al. |
| 5,912,296 A | | 6/1999 | Wang et al. |
| 5,955,547 A | | 9/1999 | Roberts et al. |
| 5,969,050 A | | 10/1999 | Vandevijver et al. |
| 6,001,469 A | | 12/1999 | Verardi et al. |
| 6,046,279 A | | 4/2000 | Roberts et al. |
| 6,184,264 B1 | | 2/2001 | Webster |
| 6,218,476 B1 | | 4/2001 | Coe |
| 6,228,948 B1 | | 5/2001 | Flaris et al. |
| 6,262,182 B1 | | 7/2001 | Eagan et al. |
| 6,310,134 B1 | | 10/2001 | Templeton et al. |
| 6,426,389 B2 | | 7/2002 | Coe |
| 6,437,049 B1 | | 8/2002 | Bortolon et al. |
| 6,451,919 B1 | | 9/2002 | Aglietto et al. |
| 6,495,629 B2 | | 12/2002 | Usui et al. |
| 6,569,950 B2 | | 5/2003 | Kitano et al. |
| 6,586,525 B1 | | 7/2003 | Urata et al. |
| 6,586,532 B1 | | 7/2003 | Gauthy |
| 6,593,423 B1 | | 7/2003 | Kondos et al. |
| 6,649,694 B2 | | 11/2003 | Jordens et al. |
| 6,699,949 B2 | | 3/2004 | Chung |
| 6,723,796 B2 | | 4/2004 | Goldblatt et al. |
| 6,777,473 B1 | | 8/2004 | Collard et al. |
| 6,831,115 B2 | | 12/2004 | Williams et al. |
| 7,388,039 B2 | | 6/2008 | Williams et al. |
| 2001/0012876 A1 | | 8/2001 | Wayne |
| 2002/0026010 A1 | | 2/2002 | Roberts et al. |
| 2002/0151656 A1 | | 10/2002 | Williams et al. |
| 2002/0156144 A1 | | 10/2002 | Williams et al. |
| 2002/0198329 A1 | | 12/2002 | Williams et al. |
| 2003/0004245 A1 | | 1/2003 | Scheibelhoffer et al. |
| 2003/0023002 A1 | | 1/2003 | Kojoh et al. |
| 2003/0208001 A1 | | 11/2003 | Gauthy |
| 2004/0054086 A1 | | 3/2004 | Schauder et al. |
| 2004/0059064 A1 | * | 3/2004 | Usui et al. ..................... 525/309 |
| 2005/0256272 A1 | | 11/2005 | Najima et al. |

FOREIGN PATENT DOCUMENTS

| | | | |
|---|---|---|---|
| EP | 355895 | * | 2/1990 |
| EP | 0 369 674 A1 | | 5/1990 |
| EP | 369674 | * | 5/1990 |
| EP | 0 406 855 A2 | | 1/1991 |
| EP | 0 489 495 A2 | | 6/1992 |
| EP | 0 767 186 B1 | | 4/1997 |
| EP | 1 036 817 A1 | | 9/2000 |
| EP | 1153996 A1 | | 11/2001 |
| GB | 1548525 | * | 7/1979 |
| GB | 2131439 A | | 6/1984 |
| JP | 46-009471 | | 2/1967 |
| JP | 51-047095 | | 10/1974 |
| JP | 55-048260 | | 4/1980 |
| JP | 58-129006 | | 8/1983 |
| JP | 58-198501 | | 11/1983 |
| JP | 2001-163984 | | 6/2001 |
| WO | 94/13761 | | 6/1994 |
| WO | WO 97/06836 | | 2/1997 |
| WO | WO-02/26846 A1 | * | 4/2002 |

OTHER PUBLICATIONS

U.S. Appl. No. 09/943,561, filed Aug. 30, 2001, Williams et al.
U.S. Appl. No. 10/068,627, filed Feb. 6, 2002, Williams et al.
U.S. Appl. No. 10/208,642, filed Jul. 30, 2002, Williams et al.
Office Action dated Jul. 24, 2007 from United States Patent and Trademark Office for U.S. Appl. No. 10/890,861.
Principles of Polymerization, George Odian, 1970, p. 97.
Notification of Transmittal of the International Search Report or the Declaration for Corresponding PCT/US02/03518, date unknown.
Notification of Transmittal of the International Search Report or the Declaration for Related PCT/US02/03775, Mar. 2003.
Office Action dated Sep. 19, 2005, in Related Application U.S. Appl. No. 10/890,861 filed Jul. 14, 2004.
Office Action dated May 18, 2006, in Related Application U.S. Appl. No. 10/890,861 filed Jul. 14, 2004.
Office Action dated Jan. 4, 2007, in Related Application U.S. Appl. No. 10/890,861 filed Jul. 14, 2004.
USPTO Office Action dated Apr. 7, 2008 for copending U.S. Appl. No. 11/218,071.
USPTO Office Action dated Jan. 26, 2009 for copending U.S. Appl. No. 11/218,071.
USPTO Office Action dated Nov. 12, 2009 for copending U.S. Appl. No. 11/218,071.
"Raw Materials Index," Apr. 1991, pp. 1-77, Set #2, National Paint & Coatings Association, Washington, DC.
"Colour Index," 1982, pp. 5216, 5227-5228, 5230, 5237-5238, 5245, 5247; 3e ed., 2d Rev., Society of Dyers and Colourists in association with the American Association of Textile Chemists and Colorists.
USPTO Office Action dated Aug. 3, 2010 for copending U.S. Appl. No. 11/218,071.
USPTO Copending U.S. Appl. No. 10/068,630, filed Feb. 6, 2002.
Notification of Transmittal of the International Search Report dated Oct. 28, 2002 for PCT/US02/24305.
Copending U.S. Appl. No. 60/616,265, filed Oct. 6, 2004.
Copending U.S. Appl. No. 11/218,071, filed Aug. 31, 2005.
Notice of Allowance dated Jun. 10, 2011 for copending U.S. Appl. No. 11/218,071.
Notification of Transmittal of the International Search Report and the Written Opinion of the International Searching Authority, or the Declaration for Related PCT/US05/036114 date of mailing Feb. 13, 2006.

* cited by examiner

MODIFIED CARBOXYLATED POLYOLEFINS AND THEIR USE AS ADHESION PROMOTERS

CROSS-REFERENCE TO RELATED APPLICATIONS

This application is a continuation-in-part application of U.S. Ser. No. 10/068,630, filed Feb. 6, 2002 now abandoned and Ser. No. 10/208,642, filed Jul. 30, 2002, now abandoned which are continuation-in-part applications of U.S. Ser. No. 09/943,561 filed Aug. 30, 2001, now abandoned which claims the benefit of U.S. Ser. No. 60/267,829 filed Feb. 09, 2001.

FIELD OF THE INVENTION

This invention relates to the field of coating compositions, and in particular, to modified polyolefins useful as primers.

BACKGROUND OF THE INVENTION

Molded plastic parts are widely used in automobiles, trucks, household appliances, graphic arts, and the like. Frequently these plastic parts are made from polyolefins such as polyethylene, ethylene copolymers, polypropylene, propylene copolymers, and polyolefin blends with other polymers. One such blend is a thermoplastic polyolefin (TPO), which is a rubber-modified polypropylene. Frequently, these plastic parts must be painted to match the color of painted metal parts that are also present in the automobile, appliance, or other item. Typical paints do not adhere well to these plastic parts. Thus, adhesion-promoting primers are needed to improve the adhesion of the paints to the polyolefin materials.

Although chlorinated polyolefins, particularly chlorinated, maleated crystalline polypropylene polymers, are effective for this purpose, they have very limited solubility in anything other than aromatic or chlorinated solvents. The U.S. Federal Clean Air Act of 1990 limits the amounts of solvents on the Hazardous Air Pollutants (HAPs) list that can be used in some areas, and most practical aromatic and chlorinated solvents for use in coatings applications are on the HAPs list. There are some applications where a non-chlorinated adhesion promoter is desired. Other systems proposed for use as primers are based on maleated amorphous polyolefins, which are dissolved in aromatic solvents such as xylene and toluene.

Attempts have been made to provide water-based paints and primers for the automotive and appliance industries, but these systems generally are not thought to be as effective as solvent-based systems. There have been several patents issued pertaining to the modification of polyolefins to provide an adhesion-promoting primer composition for paint topcoats onto polyolefin surfaces.

U.S. Pat. No. 4,146,590 describes reacting crystalline polyolefins in the molten state with an alicyclic carboxylic acid having a cis form non-conjugated double bond in the ring, such as cis-4-cyclohexene-1,2-dicarboxylic acid or endobicyclo [2,2,1]-5-heptene-2,3-dicarboxylic acid, or the anhydride of either; or an unsaturated carboxylic acid or anhydride, such as maleic anhydride or acrylic acid, resulting in a modified crystalline polyolefin having residual carboxylic acid monomer present. The polyolefin is thereafter reacted with a polyhydric alcohol or a polyamine, to thereby fix the residual monomer into the polymer. The crystalline nature of these modified polyolefins makes them practically insoluble in solvents used for liquid coatings, and therefore unsuitable for liquid coating compositions. These polymers are instead used as coatings in the solid state, requiring further heating, melting, and molding of the polymer. The fixing of the residual monomer to the polymer is taught to decrease the odor that would otherwise result from release of the monomer during the subsequent heating, melting, and molding of the polymer.

U.S. Pat. No. 4,299,754 describes a method for producing a modified propylene-ethylene copolymer, by graft copolymerization with maleic acid or anhydride. The propylene ethylene copolymer has a propylene content of 50 to 75 mole percent and a crystallinity, determined by an X-ray diffraction method, of 2 to 20%. The amount of maleic acid or maleic anhydride grafted is 0.5 to 15% by weight. The modified polymer has an intrinsic viscosity of at least 0.3, and is dissolved in the organic solvent in a concentration of 10 to 100 $kg/m^3$ of solvent. The resulting treating agent is suitable as an undercoat of the polyolefin articles and permits coating of a paint with markedly improved adhesion.

U.S. Pat. No. 4,461,809 describes a surface-treating agent used as an undercoat on the surface of a polyolefin shaped article to be coated with paint. This surface-treating agent is composed of a solution of a modified polymer in organic solvent. The modified polymer is prepared by graft copolymerization of a propylene-ethylene copolymer with an alkyl ester of a monolefinic dicarboxylic acid. The alkyl moiety of the alkyl ester is described by the general formula $C_nH_{2n+1}$, such as methyl, ethyl, n-propyl, n-butyl, isopropyl, octyl, or 2-ethylhexyl.

U.S. Pat. No. 4,632,962 describes a method for graft modifying a polyolefin with hydroxyl functional groups through an imide linkage. These modified polyolefins are made by grafting an anhydride functional group to a polyolefin chain and then reacting the anhydride group with an amine substituted organic alcohol to produce an imide. The resulting imide group on the polyolefin contains hydroxyl groups for crosslinking with various topcoats. The polyolefins are taught to be useful to produce a thermoplastic molding composition.

U.S. Pat. No. 4,966,947 describes a method for graft modifying a chlorinated polyolefin with hydroxyl functional groups through an imide linkage. These modified polyolefins are made by grafting an anhydride functional group to a chlorinated polyolefin, and then reacting the anhydride group with an amine-substituted organic alcohol to produce an imide. The resulting imide group on the chlorinated polyolefin contains hydroxyl groups for crosslinking with various topcoats.

U.S. Pat. No. 4,997,882 describes an acid- or anhydride-grafted chlorinated polyolefin that has been reacted with a monoalcohol and a polyepoxide. The composition described in this patent is prepared by grafting an unsaturated acid or anhydride onto a chlorinated polyolefin to form an acid- or anhydride-modified chlorinated polyolefin resin. This resin is then reacted with an organic monohydric alcohol to form an esterified product containing acid functionality. The resulting esterified product is then further reacted with a polyepoxide to form the ungelled modified chlorinated polyolefin resin. The resulting product is then formulated into a coating composition for a thermoplastic polyolefin substrate.

U.S. Pat. No. 5,030,681 discloses a coating resin composition obtained by graft-polymerizing an unsaturated carboxylic acid to a chlorinated polyolefin in a solvent, esterifying all unsaturated carboxylic acid present in the reaction system, and mixing the obtained composition with a urethane prepolymer.

U.S. Pat. No. 5,135,984 describes a method for modifying a chlorinated polyolefin with maleic anhydride and an acrylic-modified hydrogenated polybutadiene. This method involves the graft copolymerization of the chlorinated polyolefin with the maleic acid anhydride and acrylate modified hydrogenated polybutadiene by heating the mixture in the presence of a peroxide initiator. This results in an acrylic- and maleic anhydride-modified chlorinated polyolefin.

U.S. Pat. No. 5,143,976 describes a resin composition containing graft copolymers of acrylic monomers (A) and polydiene (B) grafted onto a chlorinated polyolefin (C). The polyolefin resin compositions composed of the acrylic oligomers contain hydroxyl or carboxyl groups and/or certain acrylic oligomers.

U.S. Pat. No. 5,523,358 describes the grafting of various unsaturated monomers to polyolefins in which an organic solvent is used to swell the polyolefin during the grafting step.

U.S. Pat. No. 5,587,418 describes a method for producing a graft copolymer for use as a primeness colored basecoat on polyolefin surfaces. The graft copolymer is obtained by copolymerizing acrylic monomers, unsaturated carboxylic acids, and acrylic monomers containing hydroxyl groups, with certain chlorinated polyolefins.

U.S. Pat. No. 5,811,489 describes a method for producing a coating resin composition based on a graft-copolymerized resin. This coating resin composition comprises a graft copolymerized resin prepared by graft copolymerizing a monomer containing an ethylenic unsaturated bond, and a monomer containing both an ethylenic unsaturated bond and a hydroxyl group, onto a mixed resin of (1) a carboxyl group-containing chlorinated polyolefin resin obtained by graft copolymerizing an unsaturated carboxylic acid or anhydride onto a polyolefin followed by chlorination and (2) a chlorinated polyolefin resin obtained by simultaneously oxidizing and chlorinating a polyolefin using at least one oxidizing agent selected from air, oxygen and ozone, an isocyanate compound or an alkyl-etherified amino resin as a curing agent.

U.S. Pat. No. 5,863,646 describes a liquid coating composition comprising a mixture of a substantially saturated polyhydroxylated polydiene polymer, having terminal hydroxyl groups, with a chlorinated polyolefin, a film forming polymer, and a carrier material. The coating can be applied to plastic substrates to improve the adhesion of subsequently applied coatings.

U.S. Pat. No. 6,001,469 describes a composition similar to that described in U.S. Pat. No. 5,863,646, and describes its use as an adhesion promoting coating that can be applied directly onto thermoplastic and thermosetting plastic substrates.

European patent application 1036817 A1 discloses a polyamide-modified polyolefin composition, which is obtained by reacting an unsaturated carboxylic acid anhydride modified polyolefin, having a specified molecular weight range, with a polyamide, having a specified molecular weight range. The resulting composition is described as having excellent adherence to polyolefin substrates without tack.

U.S. Pat. No. 6,310,134, describes solvent-based primer compositions containing 0.5 to 40 weight percent of a modified polyolefin and a solvent selected from the group consisting of ester solvents, ketone solvents, aliphatic solvents, aromatic solvents, and mixtures thereof. The polyolefins described in this report have been graft-modified with unsaturated acids, anhydrides, or esters. These modified polyolefins are reported to have good utility as primers for polyolefins substrates when topcoated with melamine based and 2-part polyurethane paints. Although these modified polyolefins provide good initial crosshatch adhesion of melamine based topcoats and good solvent resistance after application, they are deficient in water resistance, especially under high temperature and humidity conditions.

U.S. Pat. No. 6,262,182 describes a solution process for the modification of certain polyolefins with an unsaturated anhydride, unsaturated acid or unsaturated ester.

SUMMARY OF THE INVENTION

The present invention provides polyfunctional alcohol-modified carboxylated polyolefins, and their use in solvent- and water-based, adhesion-promoting primer compositions. The polyfunctional alcohol-modified carboxylated polyolefins of the present invention are prepared by reacting polyolefins, having a heat of fusion ($\Delta H_f$) of 0 to 10 calories/gram, with unsaturated carboxylic esters, unsaturated carboxylic acids, unsaturated carboxylic anhydrides, vinyl monomers, acrylic monomers, or mixtures thereof, to provide a carboxylated polyolefin. The carboxylated polyolefins are then further modified by reaction with one or more polyfunctional alcohols. The polyfunctional alcohol-modified carboxylated polyolefins are useful in solvent- and water-based coating compositions, ink compositions, and adhesive compositions.

DETAILED DESCRIPTION OF THE INVENTION

The present invention provides polyfunctional alcohol-modified carboxylated polyolefins and their use in solvent- and water-based, adhesion-promoting primer compositions. Thus, in a first embodiment, the present invention provides a polyfunctional alcohol-modified carboxylated polyolefin comprising the reaction product of at least one carboxylated polyolefin with at least one polyfunctional alcohol, wherein the carboxylated polyolefin is prepared from a polyolefin having a heat of fusion of 0 to 10 calories/gram, preferably 0 to 8 calories/gram.

The carboxylated polyolefins are prepared by reacting polyolefins having a heat of fusion of 0 to 10 calories/gram, preferably 0 to 8 calories/gram, with unsaturated carboxylic esters, unsaturated carboxylic acids, unsaturated carboxylic anhydrides, vinyl monomers, acrylic monomers, or mixtures thereof. The carboxylated polyolefins are then further modified by reaction with one or more polyfunctional alcohols.

The polyolefins useful as starting materials in the present invention are preferably amorphous, to be suitably soluble in the intended solvents, but may exhibit some measurable crystallinity. In this regard, the starting material polyolefins will exhibit a heat of fusion ($\Delta H_f$) of 0 to 10 calories/gram, preferably 0 to 8 calories/gram, as indicated by differential scanning calorimetry (DSC). The methodology for determination of heat of fusion is described below. Exemplary starting material polyolefin polymers for practice of the invention include ethylene copolymers prepared from ethylene and alpha olefins having 3 to about 10 carbon atoms, polypropylene, propylene copolymers prepared from ethylene or alpha olefins having from 4 to about 10 carbon atoms, poly(1-butene), 1-butene copolymers prepared from ethylene or alpha olefins having 3 to about 10 carbon atoms, propylene terpolymers prepared from ethylene and/or alpha olefins having from 4 to about 10 carbon atoms, and the like. In addition, mixtures of the previously mentioned polyolefins may be used in this process, as opposed to using a single polyolefin.

Preferred copolymers include propylene-ethylene copolymers comprising 70-90 mole percent propylene and about 10-30 mole percent ethylene, and having a heat of fusion of 0 to 8 calories/gram. Preferred terpolymers include propylene-butylene-ethylene terpolymers comprising 55-75 mole percent propylene, 15-30 mole percent butylene, and 5-25 mole percent ethylene, and having a heat of fusion of 0 to 8 calories/gram.

Exemplary monomers useful in the carboxylation of the starting material polyolefin include unsaturated carboxylic esters, unsaturated carboxylic acids, unsaturated carboxylic anhydrides, vinyl monomers, and acrylic monomers. Preferred monomers include, but are not limited to, maleic anhydride, citraconic anhydride, itaconic anhydride, glutaconic anhydride, 2,3-dimethylmaleic anhydride, maleic acid, fumaric acid, citraconic acid, mesaconic acid, glutaconic acid, acrylic acid, methacrylic acid, crotonic acid, 2-pentenoic acid, 2-methyl-2-pentenoic acid, dimethyl maleate, diethyl maleate, di-n-propyl maleate, diisopropyl maleate, dimethyl fumarate, diethyl fumarate, di-n-propyl fumarate, diisopropyl fumarate, dimethyl itaconate, hydroxyethyl acrylate, and mixtures thereof.

Preferably, the concentration of the carboxylating monomer is in the range of from about 1 to about 25 weight percent based on the weight of polyolefin. A more preferred range is from about 2 to about 20 weight percent. A range of about 4 to about 18 weight percent is especially preferred.

The monomers are readily grafted to polyolefins, in the solution or melt phase, using radical initiators such as organic peroxides or azo compounds as the initiator. A preferred method includes the grafting of the monomers in a solution process according to the procedure described in U.S. Pat. No. 6,262,182, incorporated herein by reference.

For grafting in the solution or melt phase, the reaction temperature is usually controlled by the half-life of the peroxide initiator. The half-life of the initiator at a given reaction temperature should be about one third to about one sixth of the reaction time. By knowing the half-life of the initiator at a specific temperature, a suitable reaction time can be quickly determined. The more stable the initiator, the longer the reaction time will be.

Examples of organic peroxides which may be used include, but are not limited to, dibenzoyl peroxide, tert-amylperoxy 2-ethylhexanoate, tert-butylperoxy 2-ethylhexanoate, tert-butylperoxy isobutyrate, and tert-butylperoxy isopropyl carbonate, tert-butylperoxy 3,5,5-trimethyl-hexanoate, 2,5-dimethyl-2,5-di(benzoylperoxy)hexane, tert-butylperoxy acetate, tert-butylperoxy benzoate, n-butyl 4,4-di(tert-butylperoxy)valerate, dicumyl peroxide, tert-butylcumyl peroxide, di(2-tert-butylperoxy isopropyl)benzene, 2,5-dimethyl-2,5-di(tert-butylperoxy)hexane, di(tert-butyl)peroxide, 2,5-dimethyl-2,5-di(tert-butylperoxy)-3-hexyne, tert-butyl hydroperoxide, cumyl hydroperoxide, and mixtures thereof.

Examples of azo compounds useful as radical initiators include, but are not limited to, 2,2'-azobisisopropionitrile, 2,2'-azobisisobutyronitrile (AIBN), dimethyl azoisobutyrate, 1,1'azobis(cyclohexanecarbonitrile), 2,2'-azobis(2-methylpropane), and mixtures thereof.

Typical concentrations of radical initiators range from about 0.1 to about 20 weight %, based on the weight of the polyolefin. A more preferred range is from about 0.2 to about 10 weight percent.

The addition of the monomers and a radical initiator can be carried out under numerous scenarios. For example, these monomers can be added before the radical initiator, concurrent with the radical initiator, or subsequent to the radical initiator. The monomer can be added in either the molten state, or as a solution in a solvent that does not interfere with the carboxylating or grafting reaction. Likewise, the radical initiator can be added in either solid or liquid form. It is also possible to charge a solution of the grafting monomer containing the initiator in a solvent that does not interfere with the desired reaction. The solvent used for this purpose can be the same as or different from the reaction solvent. The solvent preferably has a low volatility such that it flashes off and does not dilute or contaminate the reaction solvent. Preferred solvents for dissolving the grafting monomer include, but are not limited to, ketone solvents such as acetone and methyl ethyl ketone. In general, ketone solvents are used in amounts that do not cause the polyolefin to precipitate.

The carboxylating or grafting process is typically conducted in solution at temperatures ranging from about 50° C. to about 300° C., depending on the choice of reaction solvent. The carboxylating reaction may be carried out at temperatures up to and including the boiling point of the reaction solvent. A more preferable temperature range is from about 70° C. to about 240° C., and a most preferred range is from about 80° C. to about 220° C.

Following the completion of the carboxylating or grafting reaction, the reaction product may be used as is, or optionally the solvent used in the reaction may be removed by distillation at either ambient pressure, or more preferably, at reduced pressure. As a way of reducing cost in the process, the solvent may be recovered and recycled in subsequent batches. Solvents with relatively low boiling points are typically easier to remove and consequently more desirable for use in this process. Preferred solvents include tert-butylbenzene (b.p. 169° C.) and anisole (b.p. 154° C.).

In the process of the present invention, the carboxylated polyolefin is further reacted with one or more polyfunctional alcohols. Suitable alcohols will have at least two hydroxyl groups or at least one hydroxyl group and another functional group capable of reacting with the carboxylated polyolefin, such as amino, epoxy, isocyanato, and the like.

Exemplary polyfunctional alcohols include, but are not limited to, trimethylolethane, pentaerythritol, trimethylolpropane, 1,6-hexanediol, 1,4-cyclohexanediol, 1,2-propylene glycol, 1,4-cyclohexanedimethanol, 2,2,4-trimethyl-1,3-pentanediol, 2-ethyl-1,3-hexanediol, 2-butyl-2-ethyl-1,3-propanediol, diethylene glycol, triethylene glycol, polyethylene glycols, glycerol, polyester polyols, acrylic polyols, polyurethanepolyols, glucose, sucrose, 2-amino-1-propanol, ethanolamine, and the like. Preferred for use are 2-ethyl-1,3-hexanediol, 2,2,4-trimethyl-1,3-pentanediol, 2-butyl-2-ethyl-1,3-propanediol, and 1,6-hexanediol. Especially preferred are those polyfunctional alcohols having one primary hydroxyl group, and one secondary or tertiary hydroxyl group. The primary hydroxyl group, being less sterically hindered and consequently more reactive, will preferentially react with the carboxylated polyolefin, leaving the secondary or tertiary hydroxyl group pendant. These especially preferred polyfunctional alcohols include 2-ethyl-1,3-hexanediol, 2,2,4-trimethyl-1,3-pentanediol, and 1,2-propylene glycol. The amount of polyol used to modify the carboxylated polyolefin will generally be in the range of about 0.01 to about 60 weight %, based on the weight of the carboxylated polyolefin.

The polyfunctional alcohol modification reaction may be carried out in the presence or absence of a solvent. When using a solvent, the reaction is conducted at temperatures in the range of about 10° C. to about 250° C. The reaction temperature chosen will affect the time necessary to complete the reaction. Any solvent in which the carboxylated polyolefin is soluble may be used. Exemplary solvents include aromatic hydrocarbon solvents such as benzene, toluene, xylene, tert-butylbenzene, chlorinated solvents, aliphatic hydrocarbon solvents such as naphtha, mineral spirits, and hexane, ester solvents such as propyl acetate and butyl acetate as well as ketones such as methyl amyl ketone. Mixtures of solvents may be used if desired.

If desired, the polyfunctional alcohol may be reacted with the carboxylated polyolefin in the solvent used to prepare the carboxylated polyolefin. Alternatively, solvent may be removed from the carboxylated polyolefin and replaced with any suitable solvent for the reaction with the polyfunctional alcohol.

If the carboxylated polyolefin contains anhydride groups, no catalyst is required to react this material with the polyfunctional alcohols to yield the corresponding monoester and half acid groups. However, if desired, the remaining half acid groups on the polyolefin may then be further reacted with polyfunctional alcohol in the presence of excess polyfunctional alcohol and at higher temperature to yield the corresponding diester. A catalyst may or may not be needed to completely esterify all of the half acid groups.

If the carboxylated polyolefin is prepared by grafting an ester monomer such as dimethyl maleate to the polyolefin substrate, then it may be desirable to use a catalyst such as a titanium catalyst in the polyol modification reaction. Suitable titanium catalysts include titanium tetraisopropoxide, titanium tetraisobutoxide, and the like.

The polyfunctional alcohol-modified carboxylated polyolefin resins are soluble in typical coating solvents such as toluene, xylene, naphtha, mineral spirits, hexane, and ester solvents such as propyl acetate and butyl acetate as well as ketones such as methyl amyl ketone. Mixtures of solvents may be used if desired. As noted above, these polyolefins are especially useful as primers for coating substrates which suffer from poor paint adhesion. Accordingly, such resins may be applied to, for example, a plastic substrate, allowed to dry, and a conventional topcoat coating composition applied thereto. Alternatively, the polyolefins of the invention may be blended with various coating compositions to afford a self-priming composition useful for coating such substrates. In this regard, such topcoat compositions may be any coating composition, typically comprised of any number of traditional resins, for example, polyesters, acrylics, urethanes, melamines, alkyds, etc. In addition, such compositions may also further comprise one or more typical coatings additives. Thus, as a further aspect of the present invention there is provided a coating composition comprising the polyolefins of the present invention as described herein, further comprising one or more coatings additives such as leveling, rheology, and flow control agents such as silicones, fluorocarbons or cellulosics; neutralized carboxylic acid-containing latex particles with highly crosslinked particles; associative thickeners; flatting agents; pigment wetting and dispersing agents and surfactants; ultraviolet (UV) absorbers; UV light stabilizers; tinting pigments; defoaming and antifoaming agents; anti-settling, anti-sag, and bodying agents; anti-skinning agents; anti-flooding and anti-floating agents; fungicides and mildewcides; corrosion inhibitors; thickening agents; or coalescing agents.

Specific examples of such additives can be found in Raw Materials Index, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID®; polypropylene, available from Hercules Inc., under the trademark HERCOFLAT®; and synthetic silicate, available from J. M. Huber Corporation under the trademark ZEOLEX®.

Examples of dispersing agents and surfactants include sodium bis(tridecyl)sulfosuccinnate, di(2-ethylhexyl)sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium isodecyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Other examples of thickeners include the methane/ethylene oxide associative thickeners and water soluble carboxylated thickeners, for example, those sold under the UCAR POLYPHOBE trademark by Union Carbide.

Several proprietary antifoaming agents are commercially available, for example, under the trademark BRUBREAK of Buckman Laboratories Inc., under the BYK® trademark of BYK Chemie, U.S.A., under the FOAMASTER® and NOPCO®. trademark of Henkel Corp./Coating Chemicals, under the DREWPLUS® trademark of the Drew Industrial Division of Ashland Chemical Company, under the TROYSOL® and TROYKYD® trademarks of Troy Chemical Corporation, and under the SAG® trademark of Union Carbide Corporation.

Examples of fungicides, mildewcides, and biocides include 4,4-dimethyloxazolidine, 3,4,4-trimethyloxazolidine, modified barium metaborate, potassium N-hydroxymethyl-N-methyldithiocarbamate, 2-(thiocyanomethylthio)benzothiazole, potassium dimethyl dithiocarbamate, adamantane, N-(trichloromethylthio)phthalimide, 2,4,5,6-tetrachloroisophthalonitrile, orthophenyl phenol, 2,4,5-trichlorophenol, dehydroacetic acid, copper naphthenate, copper octoate, organic arsenic compounds, tributyl tin oxide, zinc naphthenate, and copper 8-quinolinate.

Examples of U.V. absorbers and U.V. light stabilizers include substituted benzophenones, substituted benzotriazoles, hindered amines, and hindered benzoates, available from American Cyanamid Company under the trademark CYASORB UV, and diethyl-3-acetyl-4-hydroxy-benzyl-phosphonate, 4-dodecyloxy-2-hydroxy benzophenone, and resorcinol monobenzoate.

Such paint or coating additives as described above form a relatively minor proportion of the coating composition, preferably about 0.05 weight % to about 5.00 weight %.

As a further aspect of the present invention, there is provided a coating composition as set forth above, further comprising one or more pigments and/or fillers in a concentration of about 1 to about 70 weight percent, preferably about 30 to about 60 weight percent, based on the total weight of the components of the composition.

Pigments suitable for use in the coating compositions envisioned by the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron Oxide); CI Pigment Yellow 42, CI Pigment Blue 15, 15:1, 15:2, 15:3, 15:4 (copper phthalocyanines); CI Pigment Red 49:1; and CI Pigment Red 57:1.

The polyfunctional alcohol modified carboxylated polyolefins of the present invention may also contain pendant carboxylic acid groups, which have the propensity to form hydrophilic salts with amines and therefore may allow the modified polyolefins of the present invention to be rendered water-dispersible. The modified carboxylated polyolefin may contain a combination of both hydroxyester and carboxylic acid functional groups. For example, this can be accomplished by reacting an anhydride functional polyolefin with 2,2,4-trimethyl-1,3-pentanediol or 2-ethyl-1,3-hexanediol to yield a modified carboxylated polyolefin containing both hydroxyester and carboxylic acid functional groups.

It is readily understood by one skilled in the art that the modified carboxylated polyolefins, having pendant carboxyl groups, may also be rendered water-dispersible by neutralization of at least a portion of the carboxyl groups with an amine (organic amine or inorganic amine) or other inorganic base (i.e., sodium hydroxide, potassium hydroxide, etc.). These modified carboxylated polyolefins may be dispersed by emulsifying the modified carboxylated polyolefin in the presence of an amine, or other inorganic base, and water; depending on molecular weight and acid number, it may be desirable or even necessary to utilize at least one surfactant, at least one amine, and water. This method for dispersing carboxylated resins is described in U.S. Pat. No. 5,373,048, incorporated herein by reference.

One group of surfactants useful in this invention may be broadly described as nonionic surfactants. The surfactants may have a molecular weight of up to 500 or greater and may include polymeric materials. The surfactants include materials that contain groups of varying polarity whereby one part of the molecule is hydrophilic and the other part of the molecule is hydrophobic. Examples of such materials include polyethyleneoxy polyols and ethoxylated alkyl phenols. Particularly preferred classes of surfactants include alkyl phenoxy poly(ethyleneoxy) alcohols, primary ethoxylated alcohols and secondary ethoxylated alcohols. Preferably the surfactant is a primary ethoxylated alcohol having 12 to 15 carbon atoms or a secondary ethoxylated alcohol having 11 to 15 carbon atoms. Examples of alkyl phenoxy poly(ethyleneoxy) alcohols include IGEPAL® CO-710 sold by Rhone Poulenc. Examples of primary ethoxylated alcohols include NEODOL® 25-9 and NEODOL® 25-12 sold by Shell Chemical Company. Examples of secondary ethoxylated alcohols include TERGITOL® 15-S-9 and TERGITOL® 15-S-15 sold by Union Carbide Company. The amount of surfactant is broadly in the range of 0 to 50 weight percent and is preferably in the range of 0 to 25 weight percent, based on the weight of the modified carboxylated polyolefin. Other examples of surfactants include those described in U.S. Pat. No. 5,663,266, incorporated herein by reference.

The amine may be a primary, secondary, or tertiary amine. The amine may be aromatic or aliphatic, but aliphatic amines are preferred. The amount of amine may be in the range of 4 to 30 weight percent and preferably is in the range of 6 to 20 weight percent, based on the weight of the modified carboxylated polyolefin. Typical amines include ammonia, ammonium hydroxide, trimethylamine, diethylamine, monoethanolamine, monoisopropanolamine, morpholine, ethanolamine, diethanolamine, triethanolamine, N,N-dimethylethanolamine, N,N-diethylethanolamine, N-methyl-diethanolamine, 2-amino-2-methyl-1-propanol and the like. Other examples of amines include those described in U.S. Pat. No. 5,373,048, incorporated herein by reference.

Inorganic bases that may be used include sodium hydroxide, potassium hydroxide, sodium carbonate, potassium carbonate, and the like.

The amount of water may vary widely and there is no upper limit on the amount of water used. There may be a lower limit on the amount of water because sufficient water should be present in the composition to result in the formation of an admixture of the components. Generally, there should be at least 50 weight percent water in the composition, based on the weight of the total composition.

The polyfunctional alcohol-modified carboxylated polyolefins of the present invention are useful, for example, in primers for plastic and metal substrates prior to painting. The polyfunctional alcohol-modified carboxylated polyolefins may be used as prepared in solvent, or may be further diluted with any of the solvents listed previously. Dispersions of the polyfunctional alcohol-modified carboxylated polyolefins may also be applied to the substrate as prepared, or they may be further diluted with water. Both the solvent- and water-based materials may be applied to the substrate by spray application, dipping, or any other means available, which allows for a uniform coating of the polyfunctional alcohol-modified carboxylated polyolefin onto the substrate. Subsequent topcoats, such as paints, adhesives, and inks, can then be applied on top of the primers of the present invention.

If desired, a co-solvent may be utilized in the waterborne compositions. In this regard, suitable co-solvents for the water-borne compositions of the present invention include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, and other water-miscible solvents.

These polyfunctional alcohol-modified carboxylated polyolefins may also be used as additives for paint topcoats. In this instance, the polyfunctional alcohol-modified carboxylated polyolefin may be added to the coating prior to application on a substrate.

This invention can be further illustrated by the following examples of preferred embodiments thereof, although it will be understood that these examples are included merely for purposes of illustration and are not intended to limit the scope of the invention.

EXAMPLES

The following tests were used to evaluate the performance of the various modified polyolefins of the present invention:

Gasoline Resistance (Abbreviated Description of GM 9501P Method B)

Painted test samples are scribed with a sharp knife to make 100 squares. The scribed test samples are immersed in a 55/45 VM&P naphtha/toluene mixture and covered with aluminum foil. After 15 minutes immersion, the test samples are evaluated for number of squares removed or blistered. This is repeated every 15 minutes until the test samples have been immersed for 60 minutes, or all squares are removed. The percent paint removed and the percent paint retained is reported at each evaluation period, and the blistering.

Cross-Cut Tape Test (Abbreviated Description of ASTM 3359 Method B)

Painted test samples are scribed with a sharp knife to make 25 squares. The center of a piece of tape is placed over the scribed area and the tape is rubbed firmly into place with a pencil eraser or other object. The tape is removed by seizing the free end and by rapidly peeling it back on itself as close to a 90-degree angle as possible. The percent paint retained is reported.

Humidity Resistance (Abbreviated Description of ASTM D 4585)

Test specimens are mounted, with the painted side facing the inside of the Cleveland Humidity cabinet. All cracks are closed between specimens to prevent vapor loss and temperature variation. The thermostat is adjusted to set the vapor temperature at 120° C. The test specimens are removed periodically, and tested by the cross-cut tape test method for adhesion and blister formation.

Determination of the Thermal Properties of Material with a TA Instruments Model 2920 Dual Sample Auto Differential Scanning Calorimeter with a Liquid Nitrogen Cooling Accessory This differential scanning calorimetry (DSC) method allows for the measurement of the amount of energy absorbed (endothermic) or emitted (exothermic) by a sample as a function of temperature. A maximum of three separately sealed aluminum pans, two containing materials of interest and one sealed empty aluminum pan as reference, are heated and cooled at a constant rate. The pans sit on raised platforms of the thermoelectric disc (constantan) which transfers heat to the sample(s) and reference positions. As heat is transferred through the disc, the differential heat flow to the sample(s) and reference is monitored by thermocouples attached to the bases of the samples and reference platforms. Data are analyzed using Universal V2.4F software of TA Instruments. Since the thermo-mechanical history of the sample was unknown, a heat-cool-heat method was applied on each sample used in this study. Sample was cooled from room temperature to −75° C. held for 30 seconds, then heated from −75° C. to 200° C. at a scanning rate of 20° C./min. in the presence of nitrogen with a purging rate of 25 cc/min. At the end of the first heating scan, sample was held at 200° C. for 2 minutes in order to erase any thermo-mechanical history along with any crystallinity inherited from sample itself and/or generated by any annealing effect. The sample was cooled down from 200° C. to −75° C. at the same rate as 20° C./min. At the end of cooling scan, sample was held at −75° C. for 30 seconds, then heated to 200° C. at the same rate of 20° C./min. for the second heating scan. The transitions along with the heats, heat of fusion for endothermic peak and heat of crystallization of exothermic peak, occurred on the second heating scan were measured.

Example 1

To a 500-ml, 3-neck round bottom flask equipped with a mechanical overhead stirrer, thermocouple, nitrogen purge, Dean-Stark trap, and a condenser was charged 138.9 grams of a maleic anhydride modified (carboxylated) polymer (25% in xylene) prepared as described in Comparative Example 1 (below) and 1.7 grams of trimethylolethane(1,1,1-tris(hydroxymethyl)ethane). The mixture was heated to 120° C. and held there with stirring for 40 minutes. The reaction mixture was cooled to 80-90° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides excellent adhesion of urethane and melamine-cured coatings onto polyolefin surfaces and provides excellent high temperature and humidity resistance.

Example 2

To a 500-ml, 3-neck round bottom flask equipped with a mechanical overhead stirrer, thermocouple, nitrogen purge, Dean-Stark trap, and a condenser was charged 197.3 grams of a maleic anhydride-modified (carboxylated) polymer (25% in xylene) prepared as described in Comparative Example 1 (below) and 2.36 grams of 1,6-hexanediol. The mixture was heated to 120° C. and held there with stirring for 30 minutes. The reaction mixture was cooled to 80-90° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides excellent adhesion of urethane and melamine-cured coatings onto polyolefin surfaces and provides excellent high temperature and humidity resistance.

Example 3

To a 500-ml, 3-neck round bottom flask equipped with a mechanical overhead stirrer, thermocouple, nitrogen purge, Dean-Stark trap, and a condenser was charged 250.0 grams of a maleic anhydride-modified (carboxylated) polymer (25% in xylene) prepared as described in Comparative Example 1 (below) and 3.80 grams of 2,2,4-trimethyl-1,3-pentanediol. The mixture was heated to 80° C. and held there with stirring for 1.5 hours. The reaction mixture was cooled to 50-60° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides improved high temperature and humidity resistance of a melamine cured coating onto polyolefin surfaces relative to Comparative Examples 1, 2, 3, and 4.

Example 4

To a 500-ml, 3-neck round bottom flask equipped with a mechanical overhead stirrer, thermocouple, nitrogen purge, Dean-Stark trap, and a condenser was charged 250.0 grams of a maleic anhydride-modified (carboxylated) polymer (25% in xylene) prepared as described in Comparative Example 1 (below) and 7.60 grams of 2,2,4-trimethyl-1,3-pentanediol. The mixture was heated to 80° C. and held there with stirring for 1.5 hours. The reaction mixture was cooled to 50-60° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides improved high temperature and humidity resistance of a melamine cured coating onto polyolefin surfaces relative to Comparative Examples 1, 2, 3, and 4.

Example 5

To a 500-ml, 3-neck round bottom flask equipped with a mechanical overhead stirrer, thermocouple, nitrogen purge, Dean-Stark trap, and a condenser was charged 250.0 grams of a maleic anhydride-modified (carboxylated) polymer (25% in xylene) prepared as described in Comparative Example 1 (below) and 3.88 grams of propylene glycol. The mixture was heated to 80° C. and held there with stirring for 1.5 hours. The reaction mixture was cooled to 50-60° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides improved high temperature and humidity resistance of a melamine cured coating onto polyolefin surfaces relative to Comparative Examples 1, 2, 3, and 4.

Example 6

To a 500-ml, 3-neck round bottom flask equipped with a mechanical overhead stirrer, thermocouple, nitrogen purge, Dean-Stark trap, and a condenser was charged 25.0 g of methyl ethyl ketone and 3.72 grams of trimethylolethane(1,1,1-tris(hydroxymethyl)ethane). The mixture was heated to 75-80° C. and was stirred at this temperature until the trimethylolethane had dissolved. To this mixture was added, over approximately 35 minutes, 125.0 grams of a maleic anhydride-modified (carboxylated) polymer (25% in xylene) prepared as described in Comparative Example 1 (below). After the addition the mixture was stirred at 85° C. for 2 hours. After 2 hours the addition funnel was replaced with a Dean-Stark trap and the low-boilers (MEK) were removed using a nitrogen sparge. The reaction mixture was cooled to 50-60° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides improved high temperature and humidity resistance of a melamine cured coating onto polyolefin surfaces relative to Comparative Examples 1, 2, 3, and 4.

Example 7

To a 500-ml, 3-neck round bottom flask equipped with a mechanical overhead stirrer, thermocouple, nitrogen purge, Dean-Stark trap, and a condenser was charged 250.0 grams of a maleic anhydride-modified (carboxylated) polymer (25% in xylene) prepared as described in Comparative Example 1 (below) and 4.60 grams of 1,3-butanediol. The mixture was heated to 80° C. and held there with stirring for 1.5 hours. The reaction mixture was cooled to 50-60° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides improved high temperature and humidity resistance of a melamine cured coating onto polyolefin surfaces relative to Comparative Examples 1, 2, 3, and 4.

Example 8

To a 500-ml, 3-neck round bottom flask equipped with a mechanical overhead stirrer, thermocouple, nitrogen purge, Dean-Stark trap, and a condenser was charged 250.0 grams of a maleic anhydride-modified (carboxylated) polymer (25% in xylene) prepared as described in Comparative Example 1 (below) and 7.46 grams of 2-ethyl-1,3-hexanediol. The mixture was heated to 85° C. and held there with stirring for 1.5 hours. The reaction mixture was cooled to 50-60° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides excellent high temperature and humidity resistance of a melamine cured coating and urethane cured coating onto polyolefin surfaces relative to Comparative Examples 1, 2, 3, and 4.

Example 9

To a 500-ml, 3-neck round bottom flask equipped with a mechanical overhead stirrer, thermocouple, nitrogen purge, Dean-Stark trap, and a condenser was charged 150.0 grams of a maleic anhydride-modified (carboxylated) polymer (25% in xylene) prepared as described in Comparative Example 1 (below) and 7.50 grams of Eastman REACTOL 100 (acrylic polyol; hydroxyl #=100). The mixture was heated to 85° C. and held there with stirring for 2.0 hours. The reaction mixture was cooled to 60-70° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides excellent high temperature and humidity resistance of a melamine cured coating and urethane cured coating onto polyolefin surfaces relative to Comparative Examples 1, 2, 3, and 4.

Example 10

To a 1-L, 3-neck round bottom flask equipped with a mechanical overhead stirrer, condenser, addition funnel, and a nitrogen inlet was charged 550 grams tert-butyl benzene and 300.0 grams of a propylene-ethylene copolymer comprised of about 80 mole percent propylene and about 20 mole percent ethylene and having a heat of fusion of approximately 5.2 calories/gram. The copolymer had a Ring and Ball Softening Point of 135° C. The mixture was heated to 150° C. over 45 minutes to provide a colorless solution. Maleic anhydride (36.0 grams) and 2,5-bis(tert-butylperoxy)-2,5-dimethylhexane (14.4 grams, radical initiator) were dissolved in 46.2 grams of acetone. The resulting solution of maleic anhydride/acetone/radical initiator was transferred to the addition funnel and charged to the reaction flask over 60 minutes. The contents of the flask were stirred for an additional 4 hours at 150° C. following the addition of the maleic anhydride and the radical initiator. The tert-butylbenzene was distilled from the reaction mixture under vacuum until nothing else distilled from the pot at a temperature of 150° C. and a pressure of 50 mm Hg. Xylene (960 grams, mixed isomers) was charged to the molten carboxylated polyolefin over 30 minutes while maintaining the temperature at 125° C. The resulting solution of the carboxylated polyolefin in xylene was cooled to room temperature and bottled.

To a 500-ml, 3-neck round bottom flask equipped with an overhead stirrer, condenser, thermocouple, and a nitrogen inlet was charged 150.0 grams of the carboxylated polyolefin solution prepared as described above, 12.3 grams of 2-ethyl-1,3-hexanediol, and 0.05 grams of p-toluenesulfonic acid. The mixture was heated to 100° C. and held at this temperature with stirring for 5 hours. The reaction mixture was cooled to 60-70° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish. Test results are listed in Table 1.

This is an example of a carboxylated polyolefin that has been modified with a polyfunctional alcohol to yield an adhesion promoter that provides excellent high temperature and humidity resistance of a melamine cured coating and urethane cured coating onto polyolefin surfaces.

Example 11

To a 5-L, 3-neck round bottom flask equipped with a mechanical overhead stirrer, condenser, thermocouple, and a nitrogen inlet was added 525.0 grams of propylene-ethylene-butylene terpolymer (Vestoplast 750 available from Degussa AG, heat of fusion of approximately 6.7 calories/gram) and 927 grams of tert-butylbenzene. The mixture was heated to 150° C. over 45 minutes and held at this temperature for 1.5 hours. During the hold period, a solution of maleic anhydride (65.7 grams) in acetone (88.9 grams) was prepared. To this solution was charged 2,5-bis(tert-butylperoxy)-2,5-dimethylhexane (25.7 grams, radical initiator). The resulting solution of maleic anhydride/acetone/radical initiator was transferred to an addition funnel and charged to the reaction flask over 2.5 hours. Following the addition, the contents of the reaction flask were stirred an additional 4 hours at 150° C. The tert-butylbenzene was distilled from the reaction mixture under vacuum until nothing else distilled from the reaction flask at a temperature of 150° C. and a pressure of 50 mm Hg. Xylene (1850 grams, mixed isomers) was charged to the molten carboxylated polyolefin over approximately 55 minutes. The resulting solution was heated to reflux and excess xylene (108 grams) was distilled out. The contents of the flask were cooled to about 60° C. and bottled. This afforded 2342 grams of a solution that had a solids content of 25.1% and an acid number of 16.9 mg KOH/gram (67.3 mg KOH/gram on a 100% solids basis).

To a 2-L, 3-neck round bottom flask equipped with an overhead stirrer, condenser, thermocouple, and a nitrogen inlet was charged 669.7 grams of the carboxylated polyolefin solution prepared as described above. The contents of the flask were heated to 90° C. and 58.7 grams of 2-butyl-2-ethyl-1,3-propanediol (BEPD) was then charged. The mixture was held at 90° C. with stirring for 8 hours. The reaction mixture was cooled to 50° C. and poured into a glass jar. This afforded 714 grams of a solution of a BEPD-modified carboxylated polyolefin.

This is an example of a terpolymer of propylene, ethylene, and butylene with a heat of fusion of approximately 6.7 cal/gram that has been maleated then modified with a polyfunctional alcohol to yield an adhesion promoter.

Example 12

In this example there is described the preparation of a dispersion of a polyfunctional alcohol-modified carboxylated polyolefin of the present invention.

To a 3-L, 3-neck round bottom flask equipped with a mechanical overhead stirrer, condenser, thermocouple, and a nitrogen inlet was added 2250 grams of a commercially available carboxylated polyolefin, AP 440-1 (25% in xylene), available from Eastman Chemical Company. This material was heated to 90° C. To this material was added, at 90° C., 134.2 grams of 2-ethyl-1,3-hexanediol over approximately 15 minutes. The mixture was stirred at 90° C. for 4 hours. The mixture was cooled to 60-70° C. and poured into a glass container. To a 500-ml, 3-neck round bottom flask equipped with a vacuum distilling head, overhead stirrer, and a thermocouple was added 350.0 g of the solution prepared as described above. This mixture was heated to 90° C. and the pressure inside the reactor was gradually reduced to strip off the solvent (xylene) from the carboxylated polyolefin solution. The pressure inside the reactor was gradually reduced from 760 to 19 mmHg. The temperature was gradually increased to 120° C. to help remove any of the remaining solvent. To a Parr Reactor was added 25.0 grams of solid 2-ethyl-1,3-hexanediol modified carboxylated polyolefin (recovered from the solvent-stripping step above), 6.0 grams of Triton N-101 (ethoxylated alkylphenol surfactant), 1.75 grams of 2-amino-2-methyl-1-propanol, and 97.0 grams of water. The reactor was sealed and heated to 150° C. The mixture was held at 150° C. with stirring for 2 hours. The mixture was then heated to 170° C. and was held at this temperature for another hour. The mixture was then cooled as quickly as possible and was poured into a glass container. The mixture was very translucent and there was only a small amount (<1.0 g) of solid remaining on the walls of the reactor. The pH of the emulsion was approximately 10.

This example demonstrates the ability to disperse the polyfunctional alcohol modified carboxylated polyolefins of the present invention into water using a surfactant, amine, and water.

Example 13

To a 5-L, 3-neck round bottom flask equipped with a mechanical overhead stirrer, condenser, thermocouple, and a nitrogen inlet was added 525.0 grams of propylene-ethylene-butylene terpolymer (Vestoplast 792 available from Degussa AG, heat of fusion of approximately 7.4 calories/gram) and 928 grams of tert-butylbenzene. The mixture was heated to 150° C. over 45 minutes and held at this temperature for 1.5 hours. During the hold period, a solution of maleic anhydride (65.6 grams) in acetone (89.4 grams) was prepared. To this solution was charged 2,5-bis(tert-butylperoxy)-2,5-dimethylhexane (25.7 grams, radical initiator). The resulting solution of maleic anhydride/acetone/radical initiator was transferred to an addition funnel and charged to the reaction flask over 2.5 hours. Following the addition, the contents of the reaction flask were stirred an additional 4 hours at 150° C. The tert-butylbenzene was distilled from the reaction mixture under vacuum until nothing else distilled from the reaction flask at a temperature of 149° C. and a pressure of 43 mm Hg. Xylene (1850 grams, mixed isomers) was charged to the molten carboxylated polyolefin over approximately 65 minutes. The resulting solution was heated to reflux and excess xylene (102 grams) was distilled out. The contents of the flask were cooled to about 60° C. and bottled. This afforded 2342 grams of a solution that had a solids content of 25.2% and an acid number of 17.4 mg KOH/gram (69.1 mg KOH/gram on a 100% solids basis).

To a 2-L, 3-neck round bottom flask equipped with an overhead mechanical stirrer, condenser, thermocouple, and a nitrogen inlet was charged 718.6 grams of the carboxylated polyolefin solution prepared as described above. The contents of the flask were heated to 90° C. and 57.5 grams of 2,2,4-trimethyl-1,3-pentanediol (TMPD) was then charged. The mixture was held at 90° C. with stirring for 8 hours. The reaction mixture was cooled to 50° C. and poured into a glass jar. This afforded 762 grams of a solution of a TMPD-modified carboxylated polyolefin with a solids content of 25.0%.

To a 1-L, 3-neck round bottom flask equipped with an overhead mechanical stirrer, distillation head and condenser, thermocouple, and a nitrogen adapter was charged 350 grams of the TMPD-modified carboxylated polyolefin, prepared as described above. To this solution was charged 7 grams of Triton N-101 (non-ionic surfactant available from Union Carbide). The resulting mixture was heated to 90° C. Pressure was reduced on the system to initiate distillation and the distillation was continued until no more distillate was collected at a temperature of 90° C. and a pressure of 20 mm Hg. Atmospheric pressure was reestablished on the system and a warm (65° C.) solution of 13.1 grams of N,N-dimethylethanolamine (DMEA) in 367.5 grams of water was charged to the reaction flask over approximately 20 minutes while maintaining the temperature above 85° C. The resulting dispersion was heated to reflux. Approximately 40 mL of distillate was collected. The dispersion was held at 90° C.-95° C. for 45 minutes, cooled to ambient temperature, then bottled in a glass jar. This resulted in a very translucent dispersion that had a solids content of 19.0% and a pH of 9.0.

This example demonstrates the ability to disperse the polyfunctional alcohol modified carboxylated polyolefin of the present invention into water using a surfactant, amine, and water.

TABLE 1

Crosshatch Adhesion Tape Test and Gasoline Resistance

| Example # | Topcoat System | Initial Adhesion (ASTM 3359) | Adhesion After Humidity (When failure occurred) (ASTM D4585) | Gasoline Resistance (% adhesion and blistering) (GM 9501P) |
|---|---|---|---|---|
| Comparative Example 1 | 2-package urethane | 100% | 100% (No failure at 504 Hrs.) | 100% (50% blistering) |
| Comparative Example 1 | 1-package melamine | 100% | 0% @ 24 Hrs. | 100% (No blistering) |
| Comparative Example 2 | 2-package urethane | 0% | NA | 0% (after 10 min.) |
| Comparative Example 2 | 1-package melamine | 0% | NA | 0% (after 30 min.) |
| Comparative Example 3 | 2-package urethane | 100% | 100% (No failure at 504 Hrs.) | 98% (after 60 min.) |
| Comparative Example 3 | 1-package melamine | 100% | 0% @ 48 Hrs. | 100% (No blistering) |
| Comparative Example 4 | 2-package urethane | 100% | 100% (No failure at 504 Hrs.) | 100% (No blistering) |
| Comparative Example 4 | 1-package melamine | 100% | 0% @ 120 Hrs. | 100% (No blistering) |
| 1 | 2-package urethane | 100% | 100% (No failure at 504 Hrs.) | 100% (No blistering) |
| 1 | 1-package melamine | 100% | 100% (No failure at 504 Hrs.) | 100% (No blistering) |
| 2 | 2-package urethane | 100% | 100% (No failure at 504 Hrs.) | 100% (50% blistering) |
| 2 | 1-package melamine | 100% | 100% at 96 Hrs. (87% at 192 Hrs.) | 100% (No blistering) |
| 3 | 2-package urethane | 100% | 100% (No failure at 504 Hrs.) | 100% (No blistering) |
| 3 | 1-package melamine | 100% | 100% at 48 Hrs. (0% at 96 Hrs.) | 100% (No blistering) |
| 4 | 2-package urethane | 100% | 100% (No failure at 504 Hrs.) | 100% (No blistering) |
| 4 | 1-package melamine | 100% | 100% at 48 Hrs. (0% at 96 Hrs.) | 100% (No blistering) |
| 5 | 2-package urethane | 100% | 100% (No failure at 504 Hrs.) | 100% (No blistering) |
| 5 | 1-package melamine | 100% | 96% at 48 Hrs. (0% at 120 Hrs.) | 100% (No blistering) |
| 6 | 2-package urethane | 100% | 100% (No failure at 504 Hrs.) | 100% (No blistering) |
| 6 | 1-package melamine | 100% | 100% at 48 Hrs. (0% at 120 Hrs.) | 100% (No blistering) |
| 7 | 2-package urethane | 100% | 100% (No failure at 504 Hrs.) | 100% (No blistering) |
| 7 | 1-package melamine | 100% | 100% at 48 Hrs. (0% at 120 Hrs.) | 100% (No blistering) |
| 8 | 2-package urethane | 100% | 100% (No failure at 528 Hrs.) | 100% (No blistering) |
| 8 | 1-package melamine | 100% | 100% (Failure between 264-528 Hrs.) | 100% (No blistering) |
| 9 | 2-package urethane | 100% | 100% (No failure at 528 Hrs.) | 100% (No blistering) |
| 9 | 1-package melamine | 100% | 100% at 48 Hrs. (55% at 96 Hrs.) | 100% (No blistering) |
| 10 | 2-package urethane | 100% | 100% (No failure at 504 Hrs.) | 100% (No blistering) |
| 10 | 1-package melamine | 100% | 100% (No failure at 504 Hrs.) | 100% (No blistering) |

Comparative Example 1

To a 1-L, 3-neck round bottom flask equipped with a mechanical overhead stirrer, condenser, addition funnel, and a nitrogen inlet was charged 275 grams tert-butyl benzene and 150.0 grams of a propylene-ethylene copolymer comprised of about 80 mole percent propylene and about 20 mole percent ethylene and having a heat of fusion of approximately 5.2 calories/gram (available from Eastman Chemical Company as Eastman Eastoflex E-1200® propylene-ethylene copolymer). The copolymer had a Ring and Ball Softening Point of 135° C. The mixture was heated to 150° C. over 45 minutes to provide a colorless solution. Maleic anhydride (12.0 grams) and 2,5-bis(tert-butylperoxy)-2,5-dimethylhexane (4.8 grams, radical initiator) were dissolved in 15.0 grams of acetone. The resulting solution of maleic anhydride/acetone/radical initiator was transferred to the addition funnel and charged to the reaction flask over 40 minutes. The contents of the flask were stirred for an additional 4 hours at 150° C. following the addition of the maleic anhydride and the radical initiator. The tert-butylbenzene was distilled from the reaction mixture under vacuum until nothing else distilled from the pot at a temperature of 150° C. and a pressure of 50 mm Hg. Xylene (478 grams, mixed isomers) was charged to the molten carboxylated polyolefin over 20 minutes while maintaining the temperature between 116-145° C. The resulting solution of the carboxylated polyolefin in xylene was cooled to room temperature and bottled. Analysis of this material yielded an acid number of 11.6 mg KOH/gram with a solids level of 25.0%. Correcting for %-solids, the acid number value increases to 46.4 mg KOH/gram for 100 percent solid material. This material was reduced to 5% solids in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries.

Paint adhesion tests were conducted in accordance with ASTM D3359B method. The results of this test were as follows: percent retained adhesion on Montell Hifax CA 187 AC TPO: 100%.

Cleveland humidity testing was conducted in accordance with ASTM D 4585 in conjunction with ASTM D 3359 at 49° C. The results were as follows: percent retained adhesion after 24 hours exposure: 0%.

Gasoline Resistance was tested using General Motors test GM 9501P Method B. Results were as follows: Percent loss after 1 hour in synthetic fuel mixture (55/45 VM&P naphtha/toluene): 0% with no blistering observed.

This composition was spray applied as a primer onto thermoplastic olefin (TPO) test plaques and air-dried for 10 minutes. After application of the primer, the panels were topcoated with an OEM 2-package urethane basecoat (206LE19689K) and clearcoat (317LE19929) from Red Spot Paint & Varnish.

Paint adhesion tests were conducted in accordance with ASTM D3359B method. The results of this test were as follows: percent retained adhesion on Montell Hifax CA 187 AC TPO: 100%.

Cleveland humidity testing was conducted in accordance with ASTM D 4585 in conjunction with ASTM D 3359 at 49° C. The results were as follows: percent retained adhesion after 48 hours exposure: 100%; percent retained adhesion after 192 hours exposure: 100%; percent retained adhesion after 504 hours exposure: 100%.

Gasoline Resistance was tested using General Motors test GM 9501P Method B. Results were as follows: Percent loss after 1 hour in synthetic fuel mixture (55/45 VM&P naphtha/toluene): 0%, but with 50% blistering observed.

Thus, this example shows that this carboxylated polyolefin adhesion promoter does not provide good high temperature and humidity resistance with the melamine-cured coating.

Comparative Example 2

A propylene-ethylene copolymer comprised of approximately 80 mole percent propylene and 20-mole percent ethylene and having a heat of fusion of approximately 5.2 calories/gram was dissolved in xylene at 5% solids. The solution was filtered to remove any undissolved polymer that might be present in the mixture. This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1. The primed panels were topcoated with an OEM 2-package urethane basecoat (206LE19689K) and clearcoat (317LE19929) from Red Spot Paint & Varnish. Test results are listed in Table 1.

This is an example of a propylene-ethylene copolymer that contains no hydroxyl or carboxyl functionality and that does not perform well as an adhesion promoter for polyolefin surfaces.

Comparative Example 3

To a 500-ml, 3-neck round bottom flask equipped with a mechanical overhead stirrer, thermocouple, nitrogen purge, Dean-Stark trap, and a condenser was charged 150.0 grams of maleic anhydride modified polymer (25% in xylene) prepared as described in Example 1 and 2.0 grams of methanol. The mixture was heated to 130-135° C. and held there with stirring for 2 hours. The reaction mixture was cooled to room temperature and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-part urethane basecoat (206LE19689K) and clearcoat (317LE19929) from Red Spot Paint & Varnish. Test results are listed in Table 1.

Comparative Example 4

To a 500-ml, 3-neck round bottom flask equipped with a mechanical overhead stirrer, thermocouple, nitrogen purge, Dean-Stark trap, and a condenser was charged 500.0 grams of maleic anhydride modified polymer (25% in xylene) prepared as described in Example 1 and 15.9 grams of 2-ethylhexanol. The mixture was heated to 90° C. and held there with stirring for 2 hours. The reaction mixture was cooled to 60° C. and poured into a glass container. This reaction mixture was reduced to 5% in toluene for spray application.

This composition was spray applied as a primer onto thermoplastic olefin (TPO) test plaques and air-dried for 10 minutes. After application of the primer, the panels were topcoated with an OEM melamine-cured basecoat (DURETHANE 802) and clearcoat (UCC 1001) from PPG Industries. Test results are listed in Table 1.

This composition was spray applied as a primer onto thermoplastic olefin (TPO) test plaques and air-dried for 10 minutes. After application of the primer, the panels were topcoated with an OEM 2-part urethane basecoat (206LE19689K) and clearcoat (317LE19929) from Red Spot Paint & Varnish. Test results are listed in Table 1.

The invention has been described in detail with particular reference to preferred embodiments thereof, but it will be understood that variations and modifications can be effected within the spirit and scope of the invention.

We claim:

1. A polyfunctional alcohol-modified carboxylated polyolefin, comprising the reaction product of: at least one carboxylated polyolefin prepared from a polyolefin having a heat of fusion of 0 to 10 calories/gram; and at least one amine-free polyfunctional alcohol, wherein the carboxylated polyolefin is the reaction product of: at least one polyolefin polymer selected from the group consisting of: ethylene copolymers prepared from ethylene and alpha olefins having 3 to about 10 carbon atoms; polypropylene; propylene copolymers containing ethylene or alpha olefins having from 4 to about 10 carbon atoms; poly(1-butene); propylene terpolymers prepared from ethylene and/or alpha olefins having from 4 to about 10 carbon atoms; and 1-butene copolymers prepared from 1-butene and ethylene or alpha olefins having 3 to about 10 carbon atoms; and at least one monomer selected from the group consisting of an unsaturated carboxylic acid ester, an unsaturated carboxylic acid, an unsaturated carboxylic anhydride, and an acrylic monomer, wherein said polyfunctional alcohol-modified carboxylated polyolefin comprises one or more pendant hydroxyl functional groups, and wherein the polyolefin polymer is an ethylene-propylene copolymer comprised of about 80 mole percent propylene and about 20 mole percent ethylene.

2. The polyfunctional alcohol-modified carboxylated polyolefin of claim 1, wherein the at least one monomer includes at least one member selected from the group consisting of maleic anhydride, citraconic anhydride, itaconic anhydride, glutaconic anhydride, 2,3-dimethylmaleic anhydride, maleic acid, fumaric acid, citraconic acid, mesaconic acid, glutaconic acid, acrylic acid, methacrylic acid, crotonic acid, 2-pentenoic acid, 2-methyl-2-pentenoic acid, dimethyl maleate, diethyl maleate, di-n-propyl maleate, diisopropyl maleate, dimethyl fumarate, diethyl fumarate, di-n-propyl fumarate, diisopropyl fumarate, dimethyl itaconate, methyl acrylate, hydroxyethyl acrylate, ethyl acrylate, methyl methacrylate, ethyl methacrylate, methyl crotonate, ethyl crotonate, hydroxyethyl acrylate, hydroxyethyl methacrylate, hydroxypropyl acrylate, hydroxypropyl methacrylate, and mixtures thereof.

3. A polyfunctional alcohol-modified carboxylated polyolefin comprising the reaction product of: at least one carboxylated polyolefin and at least one amine-free polyfunctional alcohol, wherein the carboxylated polyolefin is the reaction product of: at least one polyolefin polymer selected from the group consisting of: propylene-ethylene copolymers comprising 70-90 mole percent propylene and about 10-30 mole percent ethylene, and having a heat of fusion of 0 to 8 calories/gram, and terpolymers comprising propylene, butylenes, and ethylene having 55-75 mole percent propylene, 15-30 mole percent butylenes, and 5-25 mole percent ethylene, and having a heat of fusion of 0 to 8 calories/gram; and at least one monomer selected from the group consisting of an unsaturated carboxylic acid ester, an unsaturated carboxylic acid, and an unsaturated carboxylic anhydride, wherein said at least one monomer does not comprise an acrylic monomer; wherein said polyfunctional alcohol-modified carboxylated polyolefin comprises one or more pendant hydroxyl functional groups.

4. The polyfunctional alcohol-modified carboxylated polyolefin of claim 3, wherein the polyfunctional alcohol comprises one primary hydroxyl group and one secondary or tertiary hydroxyl group.

5. The polyfunctional alcohol-modified carboxylated polyolefin of claim 4, wherein the polyfunctional alcohol is at least one member selected from the group consisting of 2-ethyl-1,3-hexanediol, 2,2,4-trimethyl-1,3-pentanediol, and 1,2-propylene glycol.

6. A solvent-based primer composition, comprising the polyfunctional alcohol-modified carboxylated polyolefin of claim 3 and a solvent.

7. The solvent-based primer composition of claim 6, wherein the solvent includes at least one member selected from the group consisting of an ester solvent, a ketone solvent, an aliphatic solvent, an aromatic solvent, and mixtures thereof.

8. The composition of claim 3, wherein said polyolefin is said propylene-ethylene copolymer.

9. A composition comprising said polyfunctional alcohol-modified carboxylated polyolefin of claim 3.

10. The composition of claim 9, further comprising at least one resin and/or at least one pigment.

11. The composition of claim 9, further comprising a solvent and/or water, wherein said solvent is selected from the group consisting of an ester solvent, a ketone solvent, an aliphatic solvent, an aromatic solvent, and mixtures thereof.

12. A composition comprising the polyfunctional alcohol-modified carboxylated polyolefin of claim 3 and at least one amine.

13. A coating, adhesive, or ink composition comprising the polyfunctional alcohol-modified carboxylated polyolefin of claim 3.

14. A polyfunctional alcohol-modified carboxylated polyolefin, comprising the reaction product of: at least one carboxylated polyolefin prepared from a polyolefin having a heat of fusion of 0 to 10 calories/gram; and at least one amine-free polyfunctional alcohol, wherein the carboxylated polyolefin is the reaction product of: at least one polyolefin polymer selected from the group consisting of: ethylene copolymers prepared from ethylene and alpha olefins having 3 to about 10 carbon atoms; polypropylene; propylene copolymers containing ethylene or alpha olefins having from 4 to about 10 carbon atoms; poly(1-butene); propylene terpolymers prepared from ethylene and/or alpha olefins having from 4 to about 10 carbon atoms; and 1-butene copolymers prepared from 1-butene and ethylene or alpha olefins having 3 to about 10 carbon atoms; and at least one monomer selected from the group consisting of an unsaturated carboxylic acid ester, an unsaturated carboxylic acid, an unsaturated carboxylic anhydride, and an acrylic monomer, wherein said polyfunctional alcohol-modified carboxylated polyolefin comprises one or more pendant hydroxyl functional groups, and wherein the polyolefin polymer is an ethylene-propylene copolymer comprised of 70-90 mole percent propylene and about 10-30 mole percent ethylene.

* * * * *